Patented July 18, 1939

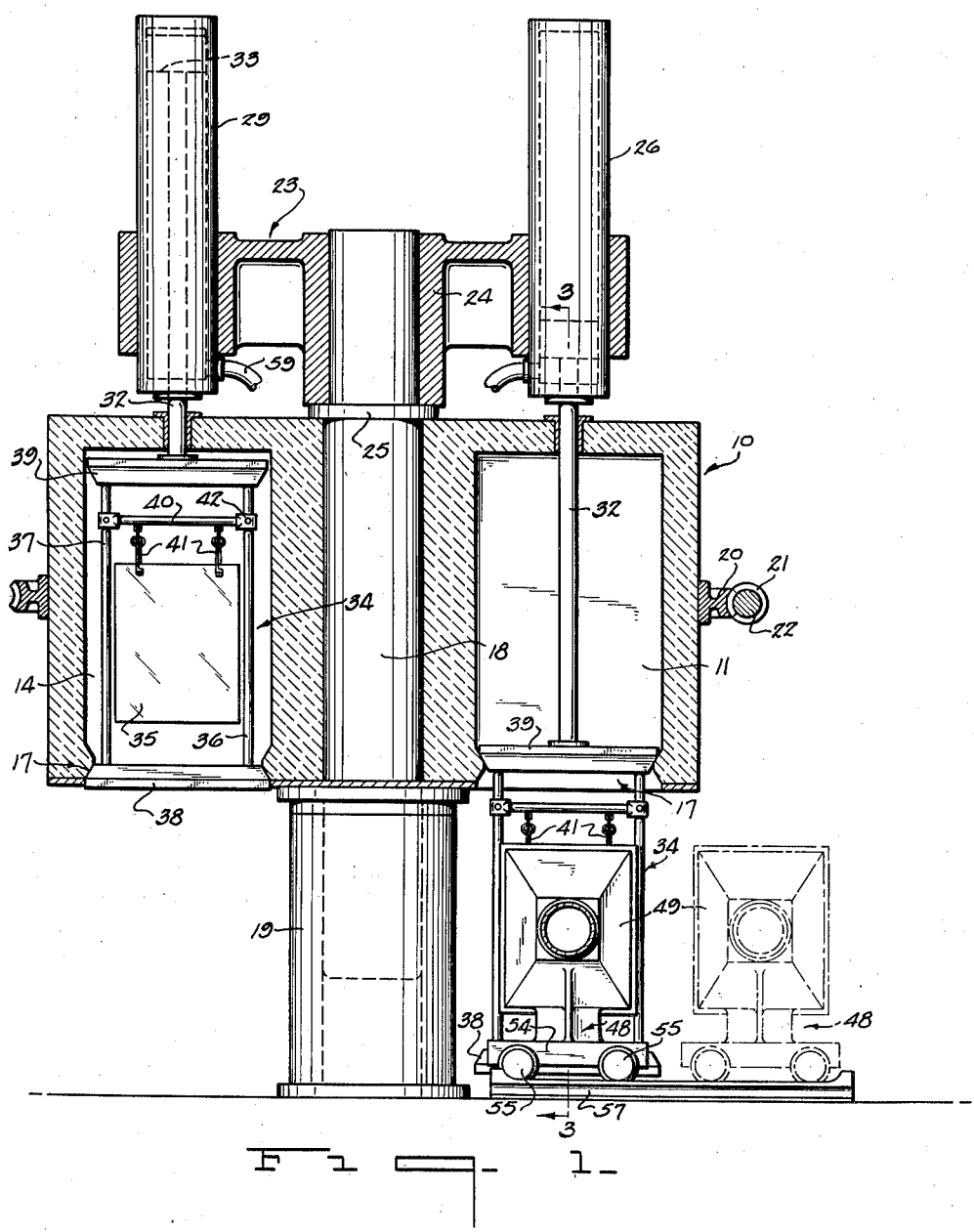

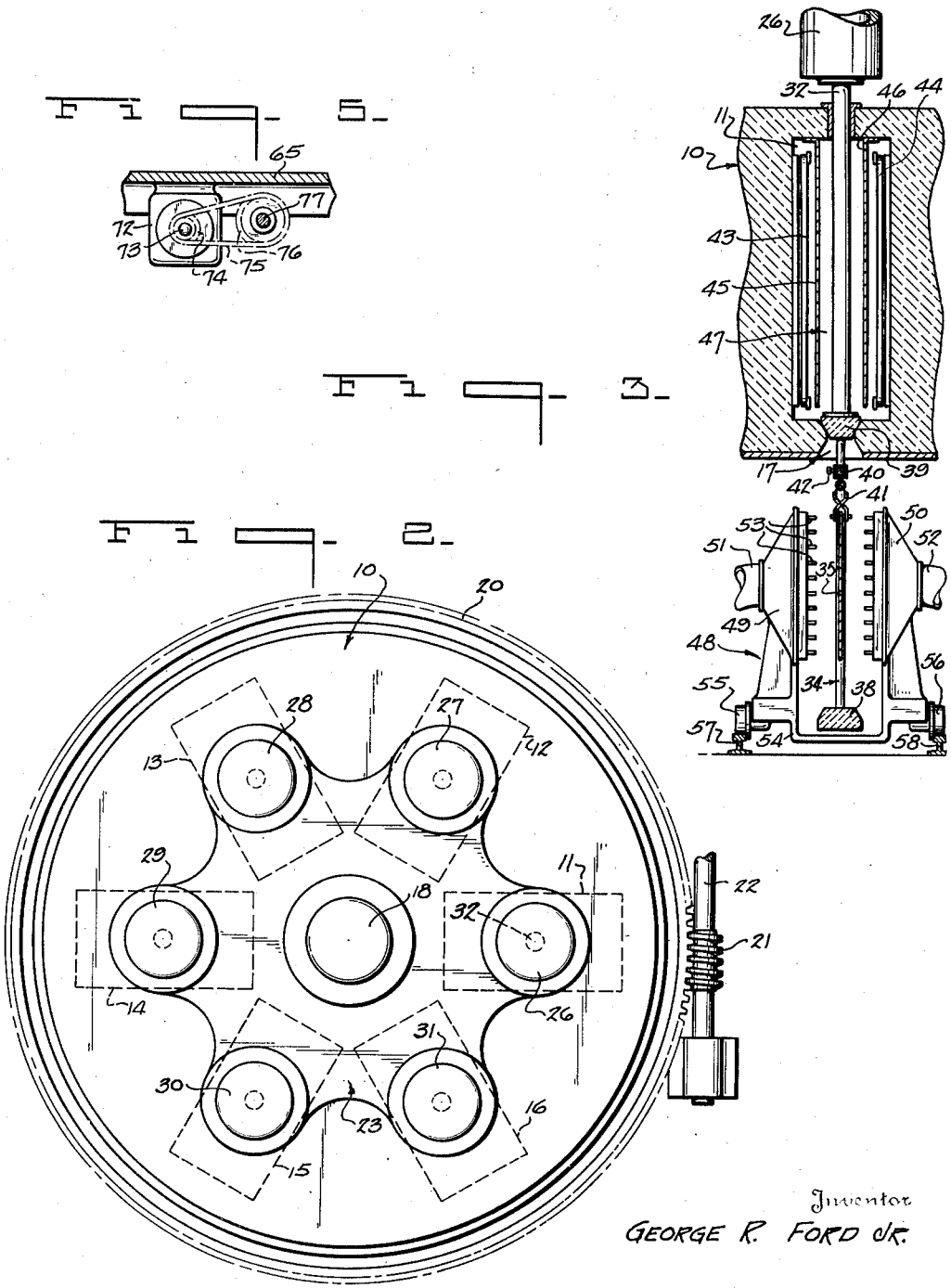

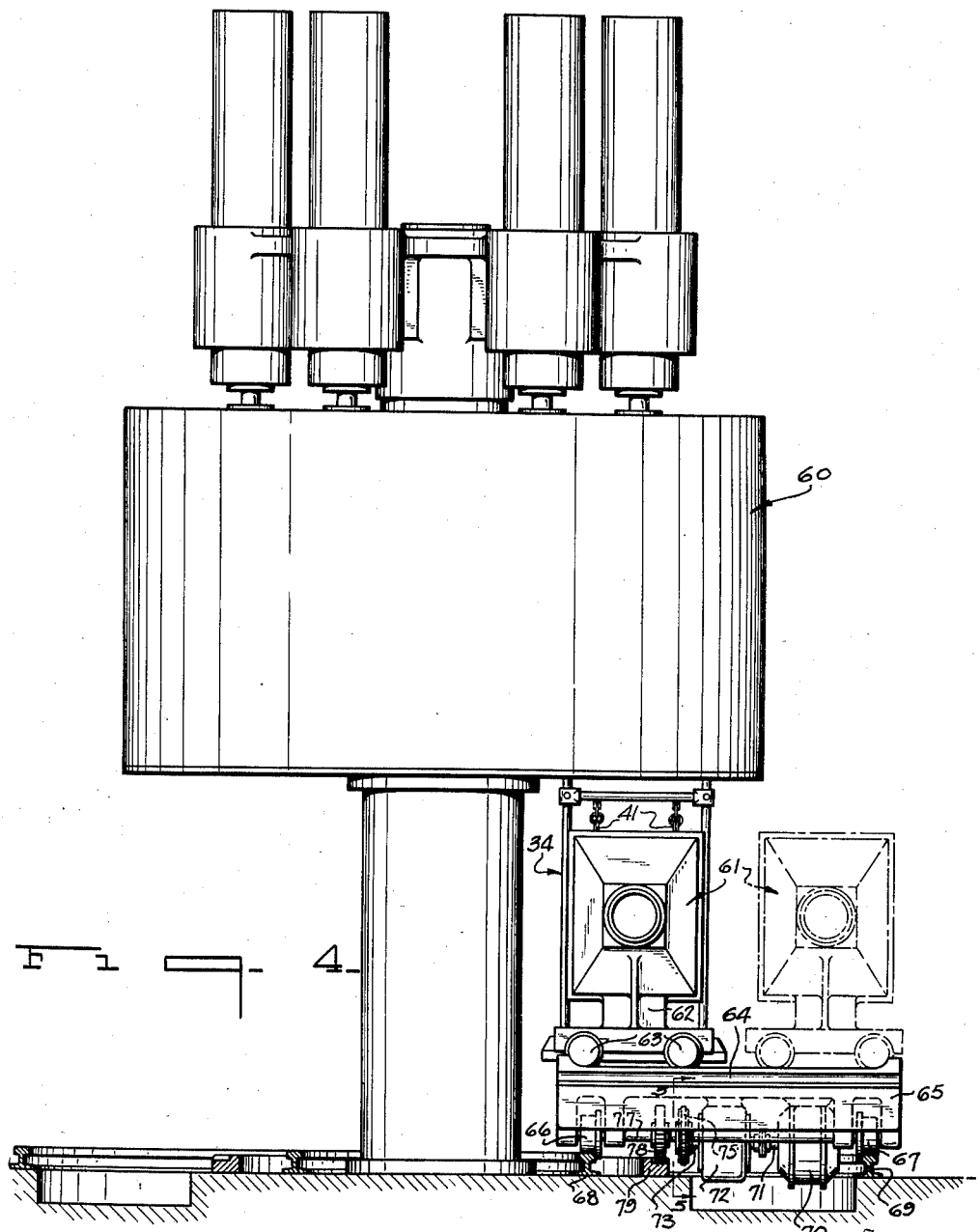

2,166,348

UNITED STATES PATENT OFFICE 2,166,348

APPARATUS FOR TEMPERING GLASS SHEETS

George R. Ford, Jr., Toledo, Ohio, assignor to Libbey-Owens-Ford Glass Company, Toledo, Ohio, a corporation of Ohio Application June 5, 1936, Serial No. 83,627

16 Claims. (Cl. 49—45)

The present invention relates to the tempering of glass and more particularly to an improved form of apparatus for tempering glass sheets or plates in a semi-continuous manner.

Generally speaking, such tempering consists in first heating a sheet of glass to approximately its point of softening and in then rapidly chilling the same to place the outer surfaces of the sheet under compression and the interior thereof under tension. Glass sheets tempered in this manner have utility as a form of safety glass since the treatment thereof not only materially increases the mechanical strength of the glass, but also changes the breaking characteristics of the sheet in that, when broken, it will disintegrate into innumerable small and relatively harmless particles instead of breaking into large dangerous pieces or splinters as in the case of ordinary glass sheets.

In accordance with the invention, there is provided an apparatus for tempering glass sheets including a furnace having a plurality of individual heating compartments which are adapted to be successively charged with glass sheets to be treated. A cooling means is associated with the furnace in such a manner that intermittent relative movement therebetween will bring successive heating compartments into operative relation with respect to the cooling means as the glass sheet in each succeeding compartment reaches the desired temperature. The heated sheet is then transferred from the furnace to the cooling means where it is rapidly chilled, the compartment thus emptied being adapted to be recharged with an untreated sheet when the next succeeding compartment is brought into operative relation with the cooling means.

With this novel and improved type of apparatus, it is possible to satisfactorily temper glass sheets or plates on a commercial scale in a semi-continuous manner without sacrificing the extreme care and accurate control that is necessary to produce tempered glass having predetermined breaking characteristics.

Other objects and advantages of the invention will become more apparent during the course of the following description when taken in connection with the accompanying drawings.

In the drawings wherein like numerals are employed to designate like parts throughout the same, Fig. 1 is a longitudinal vertical sectional view through tempering apparatus constructed in accordance with the invention;

Fig. 2 is a plan view thereof;

Fig. 3 is a transverse vertical sectional view taken substantially on line 3—3 of Fig. 1;

Fig. 4 is a side elevation of a modified form of apparatus; and

Fig. 5 is a detail sectional view taken substantially on line 5—5 of Fig. 4.

With reference first to Figs. 1 to 3 of the drawings, the numeral 10 designates a rotatable furnace of substantially cylindrical formation provided with a plurality of radially extending, equally spaced heating compartments 11 to 16 inclusive for receiving glass sheets to be treated, each of said compartments being closed at the sides and top thereof but having formed in its bottom wall a relatively narrow slot or opening 17 through which the glass sheets are introduced and removed.

The furnace 10 is mounted upon a vertical shaft 18 arranged centrally thereof, said shaft being journaled at its lower end in a supporting standard 19 upon the upper end of which the said furnace is rotatably supported. The furnace is keyed to the shaft 18 and intermittent rotation thereof is preferably effected by means of a ring gear 20 encircling the said furnace and driven by a worm 21 mounted upon the drive shaft 22.

The shaft 18 projects upwardly beyond the furnace 10 and mounted upon its upper end is a horizontal supporting member 23, the hub 24 of which rests upon a flange 25 formed on the said shaft. Carried by the supporting member 23 and arranged directly above the heating compartments 11 to 16 are the vertical cylinders 26 to 31 respectively. The top of each of the cylinders is closed while operating through the bottom thereof is a vertical piston rod 32 carrying a piston 33 at its upper end. Each piston rod 32 projects downwardly through an opening in the top wall of the respective heating compartment and has secured to the lower end thereof a frame 34 for supporting the glass sheet 35 to be treated.

Each sheet supporting frame 34 comprises the spaced vertical rods 36 and 37 tied together at their lower ends by a horizontal cross member 38 and at their upper ends by a cross member 39. The cross members 38 and 39 serve as closure means for the slot 17 in the bottom of the heating compartment during treatment of the glass sheet as will be more clearly hereinafter apparent. Extending between and slidably mounted upon the vertical rods 36 and 37 is a horizontal rod 40 carrying a pair of relatively small tongs 41 from which the glass sheet 35 is suspended. The rod 40 is movable vertically along the rods 36 and 37 to provide for glass sheets of different sizes and may be secured in desired position by the set screws 42. Although only a single relatively large sheet of glass 35 has been shown in the heating compartment 14 in Fig. 1, it will be appreciated that a plurality of relatively smaller sheets may be suspended from the rod 40 if desired.

The glass sheets are heated within the furnace to approximately the point of softening of the glass and since the sheets within the different compartments are adapted to be in different stages of heating, it is preferred that separate means be provided for heating each compartment. While the invention is not limited to any particular type of heating, there is illustrated in Fig. 3 one form of electrical heating means comprising a series of resistance units 43 and 44 respectively mounted along the opposite side walls of each of the compartments. A pair of baffle plates 45 and 46 are arranged inwardly of the resistance units 43 and 44 respectively and define therebetween a relatively narrow chamber 47 within which the glass sheet is adapted to be positioned during heating. With this arrangement, each of the compartments constitutes in effect an individual heating furnace and by the use of suitable regulating means the temperature of any one of the compartments can be controlled independently of the others. Electrical heating means of the muffle type have been found most desirable for this purpose because of the great importance of obtaining a uniform and accurately controlled heating of the glass sheets. It will be understood, however, that any suitable type of heat may be used and that all of the compartments may be heated by a common heating means if desired.

According to the invention, the several heating compartments 11 to 16 are adapted to be successively served by a single cooling unit positioned beneath the furnace and designated in its entirety by the numeral 48. In other words, upon intermittent rotation of the furnace, the several heating compartments are adapted to be successively aligned with the cooling unit 48. While it is preferred to use but a single cooling means, in the event that a furnace having a larger number of heating compartments were used or if the heating time of the tempering cycle were shortened, it might become necessary or desirable to employ more than one cooling unit.

Although the invention is in no way limited to any particular type of cooling means, the cooling unit 48 illustrated in the drawings comprises a pair of spaced blower heads 49 and 50 connected by flexible conduits 51 and 52 respectively to suitable blowers. Each of the blower heads is provided with a plurality of nipples 53 through which jets of air are adapted to be directed simultaneously upon opposite surfaces of the glass sheet when the latter is positioned therebetween. The blower heads 49 and 50 are carried by a substantially U-shaped supporting frame 54 provided at opposite sides thereof with pairs of supporting wheels 55 and 56 which run along rails 57 and 58 respectively extending radially of the furnace.

In operation, intermittent rotary movement is imparted to the furnace 10 at regular intervals to cause the heating compartments 11 to 16 to be successively and repeatedly aligned with the cooling means 48. As each compartment is brought into such position, the heated glass sheet therein is lowered into position between the blower heads 49 and 50 and properly chilled, after which the furnace is again rotated to move the cooled sheet to unloading position while, at the same time, bringing the next heating compartment into alignment with the cooling means. In order to permit the rotation of the furnace to move the cooled sheet into unloading position without the necessity of returning the sheet to the heating compartment, the cooling means 48 is moved outwardly along the rails 57 and 58 to the position indicated by the broken lines in Fig. 1. When this is done, the furnace can be rotated to bring the next succeeding compartment into alignment with the cooling means while at the same time moving the cooled sheet beyond the cooling means where it can be detached from the tongs 41 and an untreated sheet suspended therefrom and moved upwardly into the heating compartment.

The raising of the sheet supporting frame 34 into the heating compartment is effected by introducing air under pressure or liquid into the respective cylinder through a pipe 59 communicating therewith adjacent the bottom thereof and beneath the piston 33. On the other hand, when it is desired to lower the sheet supporting frame, the compressed air or liquid is permitted to escape from the cylinder through the pipe 59 whereupon the weight of the frame will cause the lowering thereof.

The horizontal members 38 and 39 at the bottom and top respectively of each sheet supporting frame 34 act as closure means for the opening 17 in the bottom of the heating compartment during the treatment of the glass sheet. Thus, the member 38 at the bottom of the frame is adapted to snugly fit within and seal the opening 17 when the sheet is being heated within the furnace while the member 39 at the top of the frame is adapted to fit within and close the opening when the sheet is lowered into position for cooling. With such an arrangement, the member 38 minimizes loss of heat from the furnace during the heating of the glass sheet while the member 39 prevents cold air from passing upwardly into the furnace during cooling of the sheet.

The timing of the furnace movements and the temperature in the several heating compartments is so controlled that during the travel of any one compartment from charging position to discharging position, the glass sheet 35 contained therein will be heated to substantially its point of softening which for ordinary flat glass is in the neighborhood of 1250° F. A plurality of glass sheets will therefore be undergoing treatment simultaneously, the sheets within the furnace being in progressively different stages of heating so that as each sheet reaches a predetermined temperature, it will be in position to be discharged from the furnace to the cooling means. As the sheet is being removed from one compartment, an untreated sheet is being introduced into the compartment just previously emptied. This design of apparatus and mode of operation will result in a highly efficient operation wherein the idle or unproductive periods of the various parts will be reduced to a minimum.

For example, glass sheets one-quarter inch in thickness have been satisfactorily tempered in a cycle of approximately six minutes comprising a five minute heating time and a cooling time of forty-five seconds, a period of approximately fifteen seconds being allowed for transferring the heated sheet from the furnace to the cooling means and the subsequent removal of the sheet after chilling. Such a cycle can be carried out with the apparatus illustrated by imparting intermittent rotary movement to the furnace 10 at intervals of one minute each. Thus, an untreated sheet of glass is introduced into the furnace every minute and five minutes will be required to advance the sheet from the loading position to the discharge position, during which time the said sheet will be brought to the desired temperature. Successive compartments are brought into alignment with the cooling means upon each movement of the furnace at one minute intervals and since the actual cooling time is forty-five seconds, fifteen seconds will be allowed for transferring the sheet from the furnace to the cooling means and the subsequent removal therefrom. Since a single cooling means is adapted to serve a plurality of heating compartments, the cooling means as well as the furnace will be in substantial continuous operation, thereby reducing to a minimum loss of time of either the machine or the operator in charge thereof.

In Figs. 4 and 5 of the drawings is illustrated a modified form of apparatus which is similar in design and operation to that shown in Figs. 1 to 3 except that the heating furnace 60 is stationary while the cooling means, designated in its entirety by the numeral 61, is adapted to revolve about the furnace. To this end, the supporting frame 62 for the blower heads is provided at opposite sides thereof with wheels 63 adapted to travel on rails 64 extending radially of the furnace and corresponding to the rails 57 and 58 in Fig. 3. The rails 64 are mounted upon a carriage 65 supported by wheels 66 and 67 which travel on circular tracks 68 and 69 respectively. Carried upon the underside of the carriage 65 is a motor 70 driving through shaft 71 and suitable reduction gearing located in casing 72, a shaft 73 to which is fixed a sprocket 74. Trained about the sprocket 74 is a sprocket chain 75 also passing around a sprocket 76 keyed to shaft 77. Also keyed to shaft 77 is a gear 78 meshing with a circular rack bar 79 so that upon operation of the motor 70, the gear 78 will be rotated to effect positive movement of the carriage 65 and cooling means 61 around the tracks 68 and 69. The cooling means is thus caused to align with successive heating compartments of the furnace by intermittent movement thereof at regular intervals. After the cooling means has been moved into operative position and the heated glass sheet lowered therebetween and cooled, the said cooling means is moved outwardly along rails 64 into operative position as indicated by the broken lines whereupon the carriage 65 can be driven along the tracks 68 and 69 to bring the cooling means into alignment with the next heating compartment. The sheet which has just been cooled is then removed from the tongs 41 and an untreated sheet suspended therefrom and moved upwardly into the furnace.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for tempering glass sheets, a unitary furnace structure formed with a plurality of heating compartments for receiving the sheets to be treated and having openings in the bottoms thereof through which the sheets are introduced and removed, means for heating said compartments, separate closure means for the openings in the bottoms of said heating compartments, cooling means positioned beneath said furnace and adapted to receive the heated glass sheets therefrom, means for causing relative movement between the furnace and cooling means to effect successive alignment of the heating compartments with said cooling means, and separate means permanently associated with each heating compartment for actuating the respective closure means therefor independently of the closure means for the other heating compartments.

2. In apparatus for tempering glass sheets, a furnace structure formed with a plurality of radially extending heating compartments for receiving the sheets to be treated and having openings in the bottoms thereof through which the sheets are introduced and removed, means for heating said compartments, cooling means positioned beneath said furnace and adapted to receive the heated glass sheets therefrom, and means for causing relative rotary movement between the furnace and cooling means to effect successive alignment of the heating compartments with said cooling means.

3. In apparatus for tempering glass sheets, a unitary furnace structure formed with a plurality of heating compartments for receiving the sheets to be treated and having openings in the bottoms thereof through which the sheets are introduced and removed, means for heating said compartments, separate closure means for the openings in the bottoms of said heating compartments, cooling means positioned beneath said furnace and adapted to receive the heated glass sheets therefrom, means for effecting movement of the furnace relative to the cooling means to bring any one of the heating compartments into operative relation with said cooling means, and separate means permanently associated with each heating compartment for actuating the respective closure means therefor independently of the closure means for the other heating compartments.

4. In apparatus for tempering glass sheets, a furnace structure formed with a plurality of radially extending heating compartments for receiving the sheets to be treated and having openings in the bottoms thereof through which the sheets are introduced and removed, means for heating said compartments, cooling means positioned beneath said furnace and adapted to receive the heated glass sheets therefrom, and means for rotating the furnace to bring any one of the heating compartments into operative relation with the cooling means.

5. In apparatus for tempering glass sheets, a unitary furnace structure formed with a plurality of heating compartments for receiving the sheets to be treated and having openings in the bottoms thereof through which the sheets are introduced and removed, means for heating said compartments, separate closure means for the openings in the bottoms of said heating compartments, cooling means positioned beneath said furnace and adapted to receive the heated glass sheets therefrom, means for effecting movement of the cooling means relative to the furnace to bring said cooling means into operative relation with any one of the heating compartments, and separate means permanently associated with each heating compartment for actuating the respective closure means therefor independently of the closure means for the other heating compartments.

6. In apparatus for tempering glass sheets, a furnace structure formed with a plurality of radially extending heating compartments for receiving the sheets to be treated and having openings in the bottoms thereof through which the sheets are introduced and removed, means for heating said compartments, cooling means positioned beneath said furnace and adapted to receive the heated glass sheets therefrom, and means for revolving the cooling means about the furnace to bring said cooling means into operative relation with any one of the heating compartments.

7. In apparatus for tempering glass sheets, a unitary furnace structure formed with a plurality of heating compartments for receiving the sheets to be treated and having openings in the bottoms thereof through which the sheets are introduced and removed, means for heating said compartments, separate closure means for the openings in the bottoms of said heating compartments, cooling means positioned beneath said furnace and adapted to receive the heated glass sheets therefrom, means for causing relative movement between the furnace and cooling means to effect successive alignment of the heating compartments with said cooling means, sheet supporting means movable vertically between the furnace and cooling means to position the glass sheets during treatment, and separate means permanently associated with each heating compartment for actuating the respective closure means therefor independently of the closure means for the other heating compartments.

8. In apparatus for tempering glass sheets, a furnace including a plurality of radially extending heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative rotary movement between the furnace and cooling means to effect successive alignment of the heating compartments with said cooling means, and sheet supporting means carried by the furnace and movable vertically between said furnace and cooling means to position the glass sheets during treatment.

9. In apparatus for tempering glass sheets, a furnace including a plurality of heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative movement between the furnace and cooling means to effect successive alignment of the heating compartments with said cooling means, sheet supporting means associated with each heating compartment and movable vertically between the furnace and cooling means to position the glass sheets during treatment, and means associated with said sheet supporting means for closing the opening in the bottom of the respective heating compartment when the glass sheet is moved into position for cooling.

10. In apparatus for tempering glass sheets, a unitary furnace structure formed with a plurality of heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative movement between the furnace and cooling means to effect successive alignment of the heating compartments with said cooling means, separate sheet supporting means associated with each heating compartment and movable vertically between the furnace and cooling means to position the glass sheets during treatment, means associated with each sheet supporting means for closing the opening in the bottom of the respective heating compartment when the glass sheet is in proper position within said heating compartment, and separate means permanently associated with each heating compartment for actuating the respective sheet supporting means independently of the sheet supporting means associated with the other heating compartments.

11. In apparatus for tempering glass sheets, a furnace including a plurality of heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative movement between the furnace and cooling means to effect successive alignment of the heating compartments with said cooling means, sheet supporting means associated with each heating compartment and movable vertically between the furnace and cooling means to position the glass sheets during treatment, means associated with said sheet supporting means for closing the opening in the bottom of the respective heating compartment when the glass sheet is moved into position for cooling, and means also associated with the sheet supporting means for closing the opening in the bottom of the heating compartment when the glass sheet is moved into proper position therein.

12. In apparatus for tempering glass sheets, a furnace including a plurality of heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative movement between the furnace and cooling means to effect successive alignment of the heating compartments with said cooling means, a sheet supporting frame associated with each heating compartment and movable vertically between the furnace and cooling means to position the glass sheet during treatment, means at the lower end of the frame for closing the opening in the bottom of the respective compartment during the heating of the glass sheet, and means at the upper end of said frame for closing the said opening during cooling of the said sheet.

13. In apparatus for tempering glass sheets, a unitary furnace structure formed with a plurality of heating compartments for receiving the sheets to be treated and having openings in the bottoms thereof through which the sheets are introduced and removed, means for heating said compartments, separate closure means for the openings in the bottoms of said heating compartments, cooling means positioned beneath said furnace and adapted to receive the heated glass sheets therefrom, means for causing relative movement between the furnace and cooling means to effect successive alignment of the heating compartments with said cooling means, separate means permanently associated with each heating compartment for actuating the respective closure means therefor independently of the closure means for the other heating compartments, and means for moving said cooling means bodily horizontally into and out of operative relation with respect to the furnace.

14. In apparatus for tempering glass sheets, a furnace structure formed with a plurality of radially extending heating compartments for receiving the sheets to be treated and having openings in the bottoms thereof through which the sheets are introduced and removed, means for heating said compartments, cooling means positioned beneath said furnace and adapted to receive the heated glass sheets therefrom, means for causing relative rotary movement between the furnace and cooling means to effect successive alignment of the heating compartments with said cooling means, and means for moving said cooling means radially of the furnace.

15. In apparatus for tempering glass sheets, a furnace for heating the sheets to be treated and having an opening therein through which said sheets are introduced and removed, cooling means positioned in proximity to the furnace, sheet supporting means movable between the furnace and cooling means to position the glass sheets during treatment, means associated with the sheet supporting means for closing the opening in the furnace when the sheets are moved into position for cooling, and means also associated with the sheet supporting means for closing said opening when the glass sheet is moved into proper position within the furnace.

16. In apparatus for tempering glass sheets, a furnace for heating the sheets to be treated and having an opening therein through which said sheets are introduced and removed, cooling means positioned in proximity to the furnace, a sheet supporting frame movable between the furnace and cooling means to position the glass sheet during treatment, means at one end of the sheet supporting frame for closing the opening in the furnace during the heating of the glass sheet therein, and means at the opposite end of said sheet supporting frame for closing the said opening when the glass sheet is moved into position for cooling.

GEORGE R. FORD, JR.